United States Patent [19]

Merritt et al.

[11] Patent Number: 5,776,554

[45] Date of Patent: Jul. 7, 1998

[54] ELECTROSTATIC POWDER COATING SYSTEM AND METHOD

[75] Inventors: Christopher R. Merritt, Noblesville; Robert M. Thorn, Indianapolis, both of Ind.

[73] Assignee: Illinois Tool Works Inc., Glenview, Ill.

[21] Appl. No.: 775,974

[22] Filed: Jan. 3, 1997

[51] Int. Cl.$^6$ .............................. B05D 1/06; B05B 1/28; B05B 15/04; B05B 15/12

[52] U.S. Cl. .................. 427/478; 427/480; 427/485; 118/64; 118/326; 118/631; 118/635; 118/DIG. 7; 454/53; 454/63

[58] Field of Search ................... 427/478, 482, 427/480, 485; 118/64, 323, 324, 326, 631, 635, DIG. 7; 454/53, 63

[56] References Cited

U.S. PATENT DOCUMENTS

| | | | |
|---|---|---|---|
| 4,590,884 | 5/1986 | Kreeger et al. | 118/308 |
| 4,714,010 | 12/1987 | Smart | 98/115.4 |
| 4,715,314 | 12/1987 | Ramseier et al. | 118/631 |
| 4,911,191 | 3/1990 | Bain | 134/200 |

OTHER PUBLICATIONS

Volstatic, Inc., Florence, Kentucky, Product Data Sheet, "Freedomcoater™ Powder Coating System", 2 pages, no date.

Volstatic, Inc., Florence, Kentucky, Freedomcoater™ Operation and Maintenance Manual, 12 pages, no date.

T. J. Bell, Akron, Ohio, Turbotech, High Velocity and Low Pressure Air Systems, 12 pages, no date.

*Primary Examiner*—Shrive P. Beck
*Assistant Examiner*—Fred J. Parker
*Attorney, Agent, or Firm*—Schwartz & Weinrieb

[57] ABSTRACT

An electrostatic powder coating system usable for coating articles transported along a substantially non-conductive article transport conveyor belt supported by a substantially non-conductive slide member. The system includes a substantially non-conductive coating booth with an open side portion supported by an upright support member disposed on a movable base member. The coating booth is laterally movable toward and away from the conveyor, and the coating booth is movable along the upright support member so as to position the coating booth downwardly toward and upwardly away from the conveyor. An electrostatic coating applicator is directed into the coating booth for applying powder coating to articles transported along the conveyor. A coating collector includes a coating booth exhaust duct coupled to the coating booth, and a conveyor exhaust duct laterally movable toward and away from the conveyor. An air knife directed toward the movable article transport conveyor belt separates powder coating from the belt and directs powder coating toward the conveyor exhaust duct where it is collected for reuse.

20 Claims, 4 Drawing Sheets

ELECTROSTATIC POWDER COATING SYSTEM AND METHOD

FIELD OF THE INVENTION

The invention relates generally to systems and methods for the application of electrostatic powder coatings to articles moved along conveyors, and more particularly to integrated powder coating booth and powder coating collection systems usable for applying different coatings to articles moved along a common conveyor.

BACKGROUND OF THE INVENTION

Systems for applying electrostatically charged powder coatings to articles moved along production lines are used increasingly in applications where high quality finishes are required, for reducing coating waste, and for complying with increasingly strict environmental regulations. Some electrostatic powder coating systems apply powder coatings to articles suspended from electrically grounded hooks moved along an overhead conveyor through a coating booth whereafter the powder coating is baked onto the article in an oven. In many overhead conveyor systems, however, the articles must be manually suspended and manually removed from the hooks of the overhead conveyor, and the coated articles must often be transferred manually to yet another overhead conveyor associated with the oven. And manual operations interrupt throughput and increase costs. Overhead conveyor systems also have a tendency for powder to accumulate on the hooks of the conveyor. This powder must be removed frequently to ensure proper electrical grounding of the articles through the hooks, which is necessary for efficient powder transfer in the coating booth. The cleaning process, however, interrupts production and further increases costs. Furthermore, articles suspended from overhead conveyor hooks tend to have different orientations relative to the powder coating applicator gun or guns. The articles may, for example, be twisting or swinging from the hooks as a result of conveyor vibration, or the articles may not be consistently aligned during suspension from the hooks by the operator. Inconsistent article orientations, whatever the cause, result in reduced coating transfer efficiency and reduced coating uniformity on the article. Overhead conveyors also make it difficult to coating articles that require masking, since masking must be performed either before application of the coating or coating must be removed from portions of the article after its application. In other applications, the articles may be difficult or practically impossible to suspend from an overhead conveyor.

Many of the problems posed by overhead conveyor systems are overcome by flat conveyor systems, particularly in applications where the article is difficult to suspend, and applications that require masking a relatively flat surface of the article. These applications include powder coatings applied to disc brake pads and automotive horns among other articles. The FreedomCoater™ powder coating system once available from Volstatic, Inc., Florence, Ky., for example, includes a powder coating booth mounted on a flat conveyor and a powder recovery system, which system provides relatively uniform and controlled film coating thicknesses. The FreedomCoater™ conveyor maintains articles in a consistent orientation relative to the coating applicator guns and serves to mask a surface of the article. The FreedomCoater™ powder recovery system collects unused powder from the coating booth, and compressed air directed toward the conveyor separates powder from the conveyor, which is also collected by the powder recovery system. The FreedomCoater™ coating booth, however, is fabricated from a PVC material that tends to attract powder, which accumulates on its interior walls. Also, the proximity of the coating applicators to the interior walls of the relatively small coating booth tends to increase powder accumulation thereon. The coating booth is also opaque, and despite small access doors often requires interruption of production and at least partial disassembly for cleaning and maintenance. Also, the Freedom-Coater™ coating system is not capable of applying different coatings, which is a significant disadvantage. Some applications, for example, require different color powder coatings, or powder coatings formulated with different compositions. To apply different powder coatings, entirely separate, dedicated Freedom-Coater™ powder coating systems are required for each different type of powder coating desired. Separate coating systems, however, have relatively large space requirements and are costly. In addition, the conveyor of each powder coating system must feed coated articles either to the conveyor of a corresponding dedicated oven, or to a common conveyor of an oven shared by the separate powder coating systems. A dedicated oven arrangement, however, has large space requirements and increases costs since a separate oven and oven conveyor is require for receiving articles from a separate conveyor of each corresponding powder coating system. A common oven arrangement requires means for transferring articles from the conveyors of separate coating systems onto a single oven conveyor, which is costly.

In view of the discussion above, there exists a demonstrated need for an advancement in the art of electrostatic powder coating systems.

OBJECTS OF THE INVENTION

It is therefore an object of the invention to provide a novel system and method for applying electrostatic powder coating to articles that overcomes problems with the prior art.

It is also an object of the invention to provide a novel system and method for interchangeably operating one of two electrostatic powder coating systems for applying different types of powder coatings to articles transported along a common conveyor.

It is another object of the invention to provide a novel electrostatic powder coating system having a coating applicator, a coating collector, and a powder feed hopper interchangeably integratable with each other for applying different powder coatings to articles transported along a conveyor.

It is a further object of the invention to provide a novel electrostatic powder coating system including a powder coating collector for collecting unused powder from a powder coating booth and conveyor.

It is yet another object of the invention to provide a novel electrostatic powder coating system including a powder coating booth and a conveyor formed of substantially electrically non-conductive materials so as to reduce the tendency of powder coatings to accumulate thereon.

SUMMARY OF THE INVENTION

The invention is, accordingly, directed to an electrostatic powder coating system usable for coating articles transported along a conveyor with a movable article transport belt. The system includes a coating booth with an open side portion supported by a coating booth support structure having an upright support member disposed on a movable base member. The coating booth support structure is laterally movable to position the coating booth toward and away from the conveyor, and the coating booth is movable along the upright support member so as to position the coating booth downwardly toward and upwardly away from the flat conveyor. An electrostatic coatings applicator is directed into the coating booth for applying powder coating to articles transported along the conveyor. A coating collector includes a coating booth exhaust duct, and a conveyor exhaust duct for collecting unused powder coating. The conveyor exhaust duct is laterally movable toward and away from the flat conveyor so as to position the conveyor exhaust duct adjacent the article transport belt, and the coating booth exhaust duct is coupleable to the coating booth when the conveyor exhaust duct is moved toward the flat conveyor. The conveyor includes an air knife directed toward the movable article transport belt for separating the powder coating from the article transport belt and directing the powder coating toward the conveyor exhaust duct, which collects the powder coating for reuse. In one embodiment, the coating booth includes substantially electrically non-conductive panels, and the article transport belt is a substantially electrically non-conductive belt with a series of electrically conductive strips electrically coupled to electrical ground for grounding the articles moved along the conveyor. Also, the article transport belt is supported by a substantially electrically nonconductive support member. The non-conductive materials reduce the tendency of powder to be attracted toward and accumulated on the coating booth interior walls and on the conveyor belt.

BRIEF DESCRIPTION OF THE DRAWINGS

These and other objects, features and advantages of the present invention will become more fully apparent upon consideration of the following Detailed Description of the Invention with the accompanying drawings, which may be disproportionate for ease of understanding, wherein like structure and steps are referenced by corresponding numerals and indicators throughout the several views, and wherein:

FIG. 4b is a partial sectional view taken along lines 4b—4b of FIG. 4a.

DETAILED DESCRIPTION OF THE INVENTION

Figure 1:
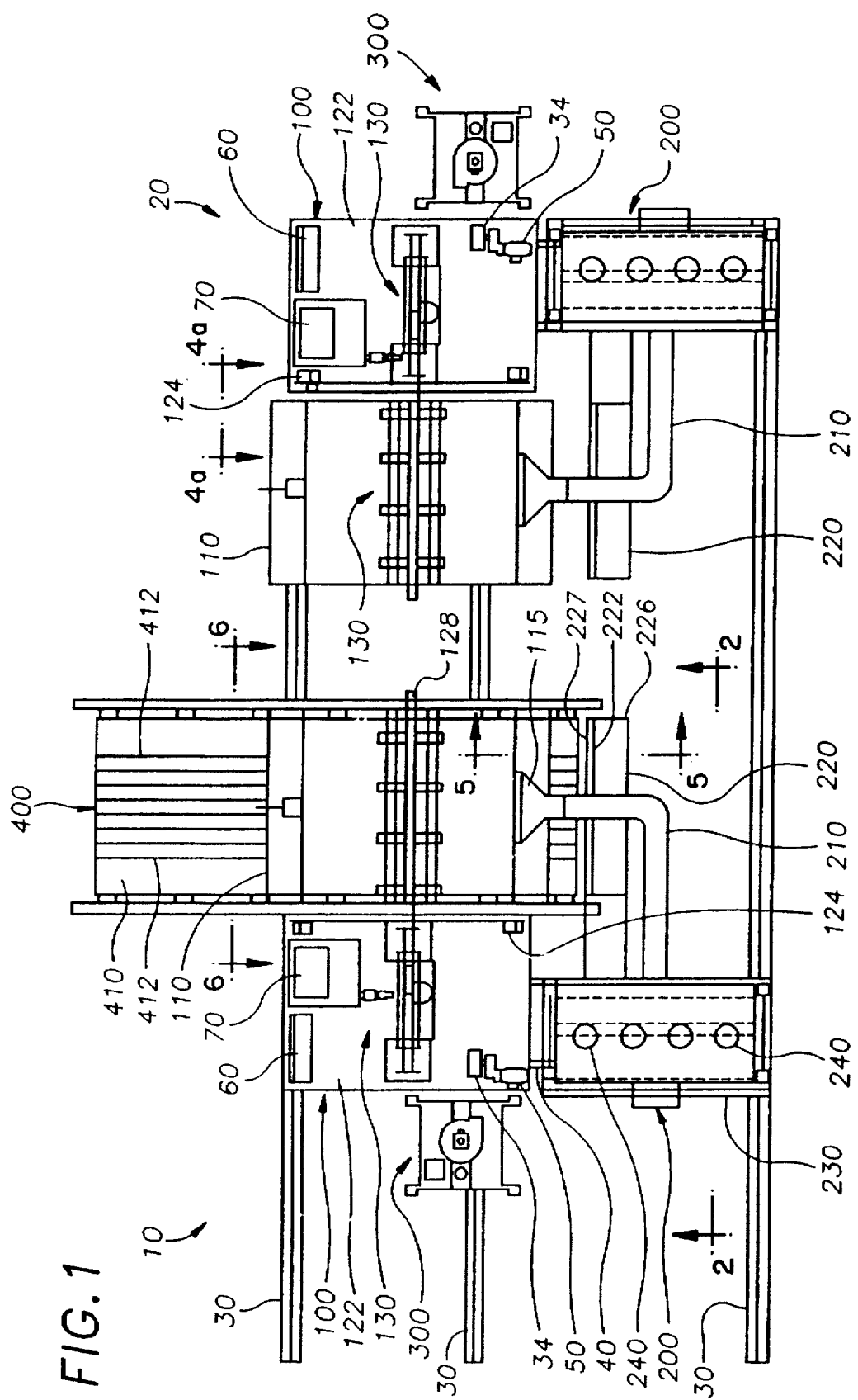
FIG. 1 is a plan view of a first electrostatic powder coating system positioned over an article transport conveyor, and a second electrostatic powder coating system positioned away from the article transport conveyor.

FIG. 1 is a plan view of a first electrostatic powder coating system 10 comprising generally a powder coating applicator 100, a powder coating collector 200, and a powder coating feed hopper 300, which are positionable for operation in combination with an article transport conveyor 400. In the exemplary embodiment, a second electrostatic powder coating system 20, substantially identical to the first system 10, is positioned away from the common conveyor 400, wherein the coating systems 10 and 20 are interchangeably positionable for exclusive on-line operation with the common conveyor 400.

According to one aspect of the invention, the powder coating systems 10 and 20 are laterally movable interchangeably toward and away from the conveyor 400 to apply different types of powder coatings to articles transported along the conveyor 400. According to another aspect of the invention, the coating applicator 100, coating collector 200 and coating feed hopper 300 are interchangeably integratable with each other so as to provide an even greater selection of powder coatings applicable to articles transported along the conveyor 400. More specifically, an off-line coating system can be readily reconfigured for applying different powder coatings by removing coating residue from the coating applicator 100 and interchanging a different coating collector 200 and different coating feed hopper 300 as further discussed below. The interchangeable operation of the coating systems 10 and 20 with the common conveyor 400 also permits performance of maintenance on the off-line coating system without prolonged interruption of conveyor operation, which generally is limited to the time required to interchangeably position coating systems 10 and 20 for on-line operation with the common conveyor 400. According to yet another aspect of the invention, the coating applicators 100 of systems 10 and 20 are configured for applying powder coatings to different types of articles transported along the common conveyor 400. An upright article, for example, may require a different powder coating distribution or application than a relatively flat article. These and other aspects, features and advantages of the invention are discussed further below.

Figure 2:
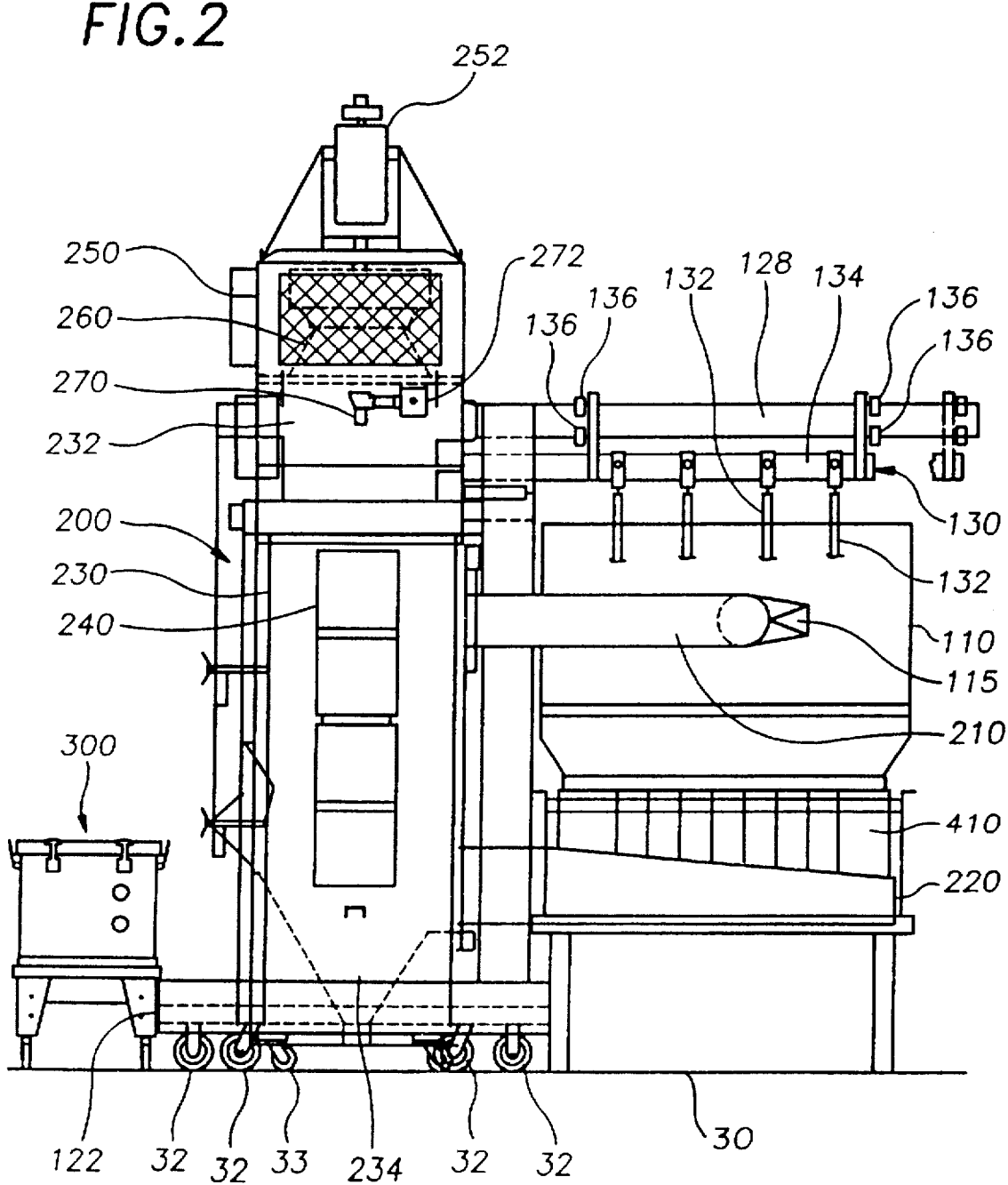
FIG. 2 is a partial sectional view taken along lines 2—2 of the powder coating system of FIG. 1.

FIGS. 1 and 2 show the coating applicator 100 comprising generally a coating booth 110 supported by a coating booth support structure having a movable base 122 and one or more upright support members 124, and a coating gun assembly 130 extending into the coating booth 110. In the exemplary embodiment of FIGS. 1 and 2, the coating gun assembly 130 includes one or more guns 132 adjustably mounted on a reciprocatable support member 134 and extending downwardly through openings partially into the coating booth 110 as further discussed below. The reciprocatable support member 134 is movably coupled to an overhead support member 128 by rollers 136 that permit the reciprocatable support member 134 to move laterally back and forth. The portion of the coating gun assembly 130 extending into the coating booth 110 moves laterally relative to the coating booth. Operation of the coating gun assembly 130 is controllable from a gun control panel 70 mounted on the movable base 122.

The coating booth support structure is laterally movable to position the coating booth 110 toward and away from the conveyor 400, and the coating booth 110 includes an open bottom portion that is positionable over the conveyor 400 when the coating booth support structure is positioned toward the conveyor 400. Also, the coating booth 110 is movably coupled to the upright support member 124, and is movable along the upright support member 124 so as to position the coating booth downwardly toward and upwardly away from the conveyor 400. The coating booth 110 moves upwardly and downwardly along the upright support member 124 relative to the coating gun assembly 130, which in the exemplary embodiment is movable laterally but may be stationary in other applications. The movement of the coating booth 110 is unaffected by the portion of the coating gun assembly 130 extending into the coating booth or by the lateral movement of the coating gun assembly 130.

Figure 3:
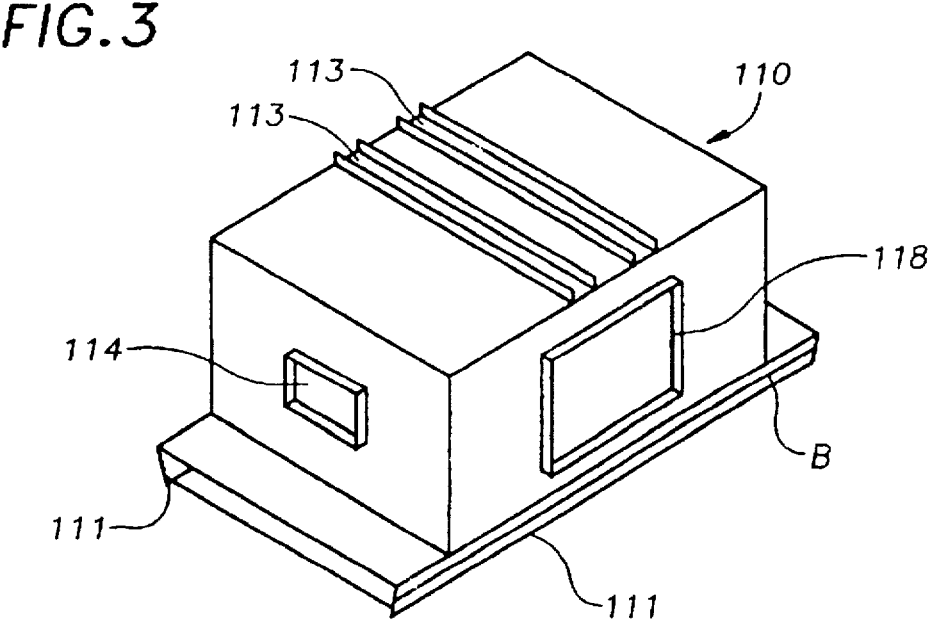
FIG. 3 is a partial perspective view of a coating booth according to an exemplary embodiment of the invention.

FIG. 3 is a perspective view of the coating booth 110 having an open bottom portion defined in part by opposing lateral sides 111, which is configured to be positioned over the conveyor 400 without substantial space between the lateral sides 111 of the coating booth 110 and the conveyor 400. In the exemplary embodiment of FIG. 4a, each lateral side 111 includes a resilient sealing member 112 extending downwardly and lengthwise therealong. The resilient sealing members 112 preferably contact the conveyor 400 so as when the coating booth 110 is positioned downwardly toward the the conveyor 400 so as to provide a seal between at least a portion of the coating booth 110 and the conveyor to facilitate powder coating reclamation as further discussed below. In the exemplary configuration, the resilient sealing members 112 are disposed at an angle relative to the coating booth 110 wherein each the sealing member 112 tends to flex inwardly as the resilient members 112 contact the conveyor 400, which provides a more uniform seal and confines the powder coating as further discussed below. Other sealing member configurations may alternatively be used to provide the seal between the lateral sides 111 of the coating booth and the conveyor 400, and other embodiments may provide a virtual seal by accurately positioning the coating booth 110 proximate the conveyor 400 in the absence of a sealing member.

FIG. 3 also illustrates the coating booth 110 having openings 113 on an overhead portion for receiving portions of the coating gun assembly 130 within the coating booth 110. The openings 113 permit lateral movement of the coating gun assembly 130 relative to the coating booth 110. Other embodiments may include additional openings on the overhead portion of the coating booth 110, and alternatively on any of the vertical side wall portions of the coating booth for accommodating portions of other coating gun assembly configurations. In one configuration, the openings 113 are at least partially closed by resilient flaps converging from opposing sides of the openings 113, not shown in the drawing, wherein portions of the coating gun assembly 130 protrude through the resilient flaps and remain free to reciprocate laterally therebetween as discussed above. The coating booth 110 also includes an opening 114 on at least one of the side walls for exhausting air and unused powder coating from within the coating booth 110 to the coating collector 200. FIGS. 1 and 2 show an exhaust duct coupling member 115 protruding from the opening 114 of the coating booth 110 for coupling a coating booth exhaust duct 210 of the coating collector 200.

The coupling member 115 allows the coating booth 110 to move upwardly and downwardly relative to the exhaust duct 210 wherein the coating booth 110 is coupled to the exhaust duct 20 when the coating booth 110 is positioned downwardly toward the conveyor 400. At least the exhaust duct 210 of the coating collector 200 is movable laterally relative to the coating booth 110 when the coating booth 110 is moved upwardly along the upright support member 124 and the coupling member 115 is disengaged from the exhaust duct 210.

The coating booth 110 is preferably formed of electrically non-conducting materials so as to reduce the tendency of the powder coatings to accumulate on interior wall surfaces. FIG. 2 shows the relatively large overall dimensions of the coating booth 10 providing some distance between the coating booth walls and nozzle portions of the coating gun assembly 130 disposed within the coating booth 110, which further reduces the tendency of coating material to accumulate on the interior wall surfaces of the coating booth 110. The specific dimensions and configuration of the coating booth 110 depends on the coating gun assembly configuration and the articles transported along the conveyor 400 among other factors. In the exemplary embodiment of FIG. 4a, the coating booth 110 is formed by substantially rigid framing members 116 and wall panels 117. In one embodiment, the panels 117 are formed of a clear polycarbonate material, which is lightweight, non-conducting and permits visibility into the interior of the coating booth 110. The framing members 116 may also be formed of a polycarbonate material, and alternatively, where additional strength is required, of a metal material. The metal material does not substantially affect the tendency of the powder coatings to accumulate on the interior wall surfaces of the coating booth 110. The resilient sealing member 112 is similarly formed of an electrically non-conducting material so as to reduce its tendency to attract and accumulate powder coating.

Figure 4A:
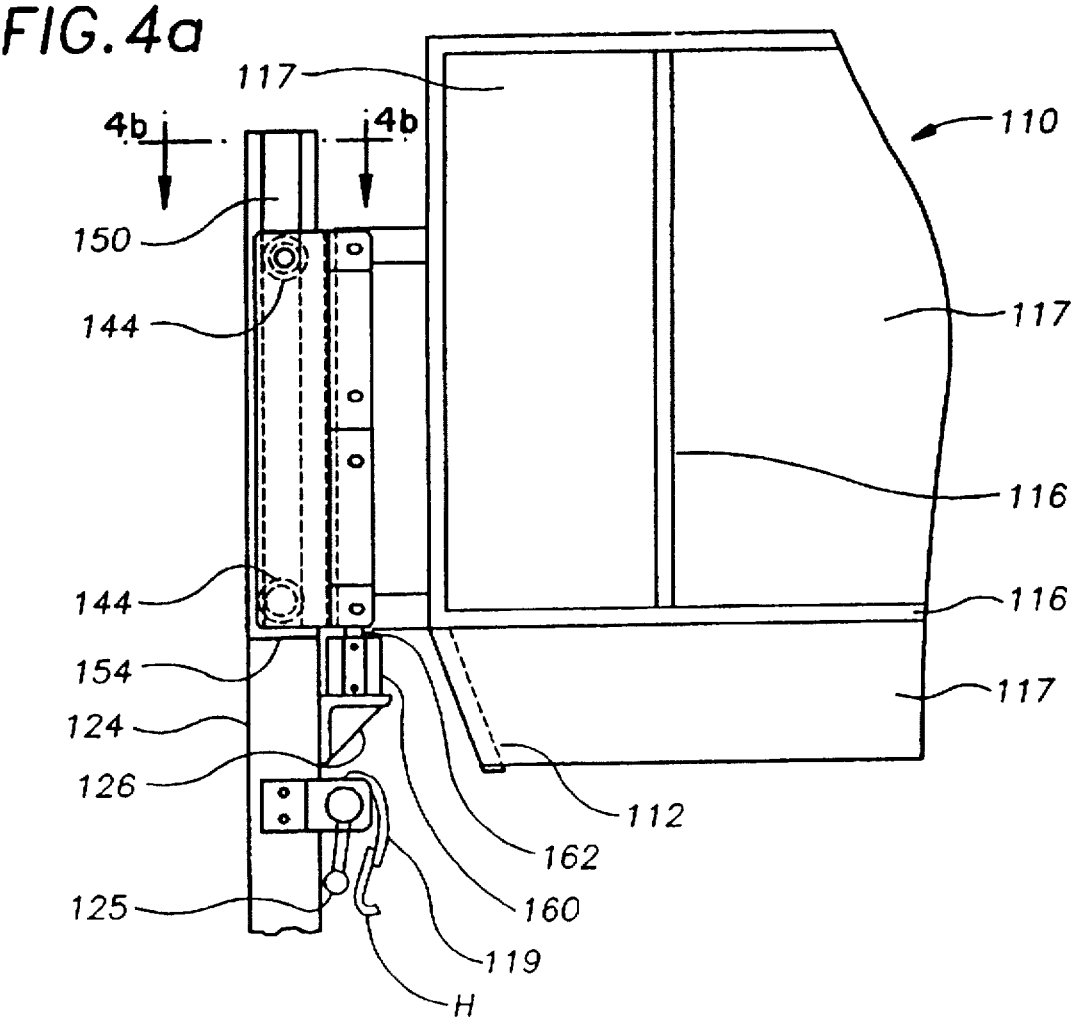
FIG. 4a is a partial side view taken along lines 4a—4a of the coating applicator of FIG. 1.

The coating booth 110 of the exemplary embodiment of FIG. 3 includes at least one removable window or panel 118 on its side portion for providing ready access to an interior portion of the coating booth 110, which may be required for cleaning and maintenance. FIG. 4a illustrates a canvas 119 fastenable over the open bottom portion of an off-line coating booth 110 so as to substantially seal the open bottom portion, which further facilitates cleaning and maintenance by permitting collection of powder coating from within an off-line coating booth 110 by the coating collector 200. In the exemplary embodiment, the canvass 119 is fastened along one of its sides to a rotatable support member supported by the upright members 124 adjacent the coating booth 110. The rotatable support member includes a hand crank 125 for coiling the canvass 119 about the rotatable support member. In operation, the canvas 119 is uncoiled from the rotatable support member and stretched over the open bottom portion of the off-line coating booth 110. A series of hooks H disposed along another end portion of the canvas 119 are engageable with an engagement member, or bar B, on an outer side of the coating booth 110 shown in FIG. 3. The coating booth 110 is movable along the upright support members 124 to a downward position so that the canvas 119 contacts and forms a seal along the inner and outer opposite lateral sides 111 of the coating booth 110, or along the resilient sealing members 112 in the exemplary embodiment of FIG. 4a.

Figure 4B:
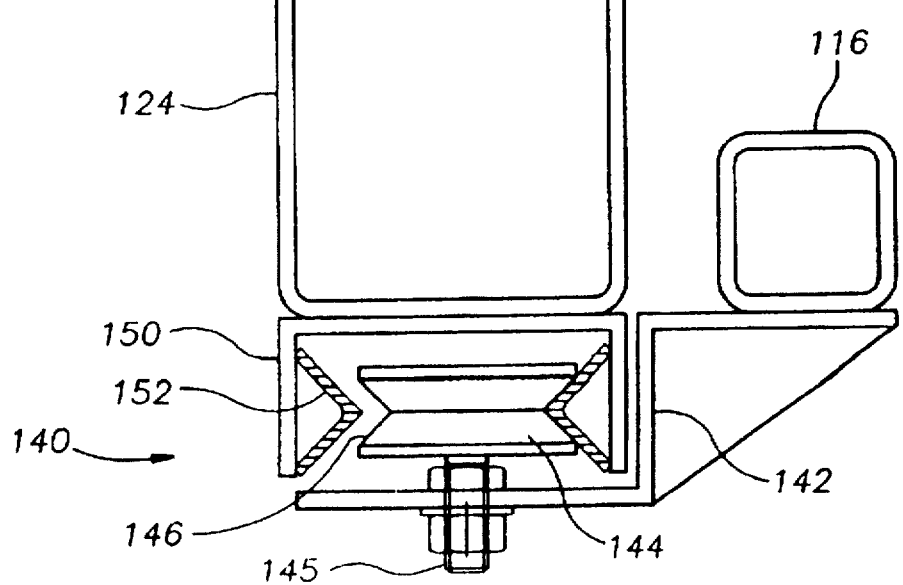

The exemplary embodiment of FIGS. 4a and 4b show the coating booth 110 movably coupled to the upright support member 124 by a carriage assembly 140 including a carriage frame 142 fixedly coupled to one or more framing members 116 of the coating booth 110. The carriage frame 142 includes rollers 144 movably retained in a roller guide 150 secured to the upright support member 124. The rollers 144 have a notched surface 146 that is retained by a complementary shaped member 152 protruding from inner sides of the roller guide 150. The rollers 144 are rotatably coupled to the carriage frame 142 by support pins 145. The roller guide 150 may include a stop member 154 for limiting downward movement of the carriage assembly 140 along the upright support member 124.

An actuatable member mounted on the coating booth support structure moves the coating booth 110 upwardly and downwardly along the upright support member 124. In the exemplary embodiment of FIG. 4a, an actuatable member 160 is mounted on a support member 126 of the upright support member 124 and includes a ram 162 extending upwardly toward the coating booth 110 and carriage assembly 140. The ram 162 acts on the framing member 116 of the coating booth 110 or on the carriage assembly 140 either directly or indirectly. In one embodiment, the actuatable member 160 is pneumatically actuatable on command to move the coating booth 110 upwardly and downwardly along the upright support member 124. The actuatable member 160 may alternatively be actuatable hydraulically. Generally, the upwardly and downwardly range of motion of the coating booth 110 is determined by the amount of movement required to permit lateral movement of the coating booth 110 toward and away from the conveyor 400. In the exemplary embodiment, the coating booth 110 has a range of upwardly and downwardly motion along the upright support member 124 between approximately 1 and 8 inches. Operation of the actuatable member 160 is controllable from the system control panel 60 mounted on the movable base 122.

Figure 5:
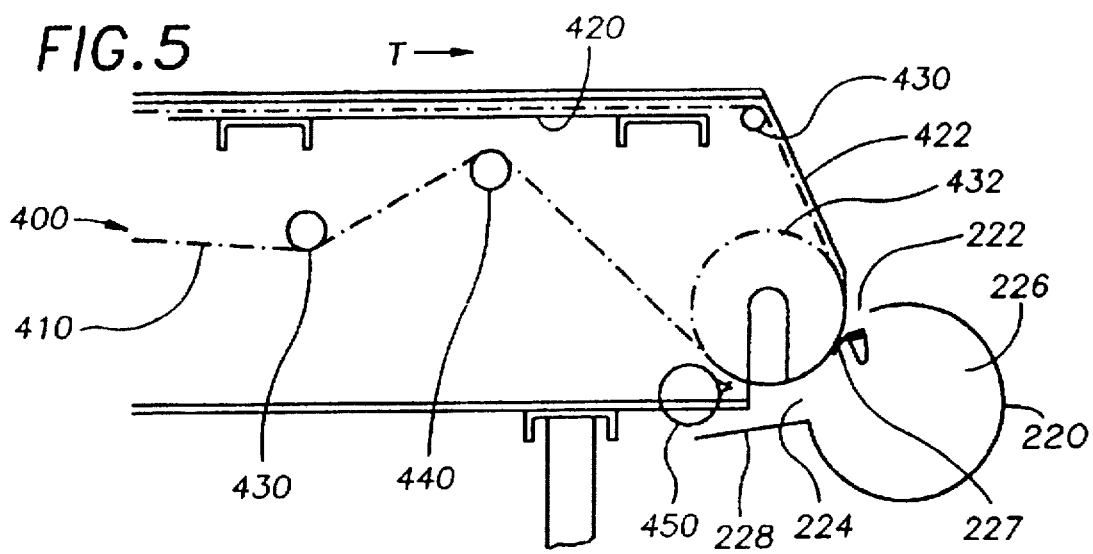
FIG. 5 is partial sectional view taken along lines 5—5 of the article transport conveyor of FIG. 1.
Figure 6:
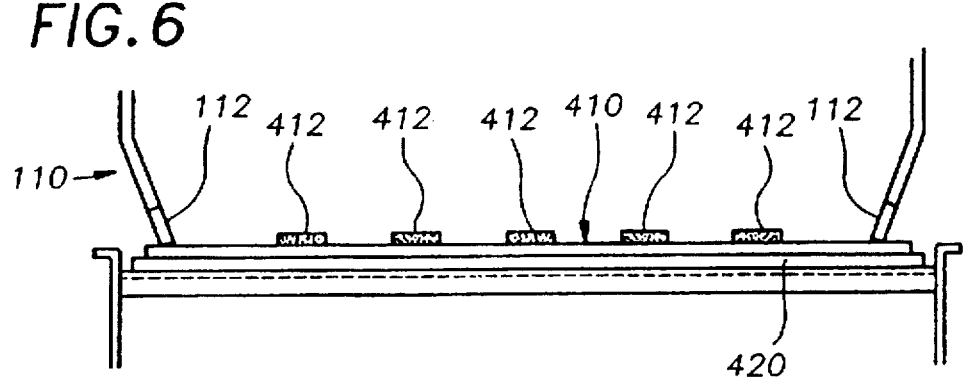
FIG. 6 is a partial sectional view taken along lines 6—6 of an article transport conveyor of FIG. 1.

FIG. 5 is a partial sectional view of the flat conveyor 400 according to an exemplary embodiment of the invention including a movable article transport belt 410, which according to one embodiment is formed of an electrically non-conductive material so as to reduce the tendency of the belt 410 to attract and accumulate powder coating. The belt 410 also has preferably has a relatively smooth surface so as to facilitate removal of any powder coating from the belt surface as further discussed below. FIG. 6 shows the belt 410 including a plurality of continuous electrically conductive strips 412 arranged in series and each disposed lengthwise about upon an outer surface of the belt 410. In one embodiment, the belt 410 is a laminated multi-layer member, and the conductive strips 412 are welded into grooves formed along the belt 410 by removing portions of one or more of the laminated layers. The strips 412 protrude slightly above the belt surface and are coupled to electrical ground potential as discussed further below. The strips 412 protrude above the belt 410 to an extent required to provide electrical contact with articles transported along the conveyor 400 and at the same time minimize the amount of powder coating that adheres to the under side, or masked surface, of the article. The spacing between adjacent strips, the number of strips, and the height the which the strips protrude above the belt, however, is necessarily determined by a number of factors including the size and shape of the article as well as powder coating application parameters. Generally, the strips 412 are raised between 0.005 and 0.062 inches above the belt surface, and in one application the strips 412 are raised 0.025 inches above the belt 410, which provides good article ground contact and substantially eliminates adherence of powder to the masked surface of the article.

The article transport belt 410 is supported on the conveyor 400 by a substantially flat slide base member 420, which according to one embodiment is formed of an electrically non-conductive material so as to reduce its tendency to attract any powder coating toward the belt 410. The conveyor 400 also includes a number of transverse members 430, which may or may not be rotatable, for guiding and supporting the belt 410 as the belt 410 moves in the direction of arrow T. A transverse conductive member 440, coupled to electrical ground potential, is arranged across the belt surface and in electrical contact with the plurality of conductive strips 412 so as to provide a ground contact for articles transported along the conveyor 400. A rotatable member 432 is disposed below the slide base member 420 toward an end portion of the conveyor 400 so as to provide a downward sloping belt portion 422 as the belt 410 is guided about the roller 432. In one embodiment, the belt 410 is driven at a variable speed between approximately 5 and 20 feet per minute by a totally enclosed, fan cooled motor. Operation of the conveyor 400 is controllable from the system control panel 60 mounted on the movable base 122, or alternatively is controlled from a remote control panel, which may also control connecting conveyors along the production line.

The conveyor 400 also includes generally a cleaning member disposed proximate the article transport belt 410 for removing or separating powder coating from the article transport belt 410 surface. The cleaning member may comprise compressed air directed toward the article transport belt 410, or an air knife directed toward the belt 410, or a high vacuum duct positioned very near or in contact with the article transport belt 410, or rotating brushes in contact with the article transport belt 410. The cleaning member may operate alone or in combination with a collecting member such as a vacuum for collecting powder coating removed or separated from the article transport belt 410. Other embodiments of the invention may include combinations of one or more of the article transport belt cleaning members and configurations discussed above.

In the exemplary embodiment of FIG. 5, the conveyor 400 includes an air knife 450 disposed transversely to the article transport belt 410 for directing a high velocity, low pressure air stream toward the belt 410 so as to separate any powder coating accumulated thereon. The air knife 450 preferably directs the air stream across the full width of the belt 410 and in a direction that opposes the direction of belt travel T. The air knife 450 also directs powder coating removed from the belt 410 toward a conveyor exhaust duct 220 of the coating collector 200 positionable adjacent the article transport belt 410. The angle of the air stream relative to the belt 410 is adjustable to optimize its effectiveness. An air knife suitable for use in this application is available from T. J. Bell Incorporated, Akron, Ohio. Operation of the air knife 450 is controllable from a control panel mounted on the conveyor 400.

In the exemplary embodiment of FIGS. 1 and 5, the conveyor exhaust duct 220 of the coating collector 200 includes an upper opening 222 extending along the width of the belt 410 so as to collect powder coating spilling from the downward sloping belt portion 422, and a lower opening 224 extending along the width of the belt 410 so as to collect powder removed and directed toward the conveyor duct exhaust 220 by the air knife 450. The smooth belt surface facilitates separation of the powder coating from the belt 410 by the air knife 450, which permits removal of substantially all of the powder coating from the belt 410 by the conveyor exhaust duct 220. An end plate 226 encloses an end portion of the conveyor exhaust duct 220, which may be a tapered exhaust duct, and supports one end of an air deflector 227 extending along the width of the belt 410 and separating the upper opening 222 from the lower opening 224. The air deflector 227 is preferably a resilient material that contacts the belt 410, or is at least positioned very close thereto, and is configured to direct the air stream from the air knife 450 toward the conveyor exhaust duct 220. The air deflector 227 may be adjustably mounted on the conveyor exhaust duct 220 for radial adjustment toward and away from the belt 410, and for angular adjustment relative to the belt 410. The conveyor exhaust duct 220 also includes a lower lip portion 228 extending partially under the belt 410 so as to maximize containment and collection of unused powder coating. In the exemplary embodiment of FIG. 6, the resilient sealing members 112 of the coating booth 110 are positioned in contact with the belt 410 when the coating booth 110 is moved downwardly toward the conveyor 400. According to this configuration, the inwardly directed resilient sealing members 112 of the coating booth 110 confine powder coating accumulation to the belt surface where it is most efficiently reclaimable by the coating collector 200 as discussed above.

In the exemplary embodiment of FIGS. 1 and 2, the coating booth exhaust duct 210 and the conveyor exhaust duct 220 are coupled to a filter housing 230 containing an array of filter cartridges 240. Each filter cartridge 240 includes one or more substantially annular filters arranged end to end with a sealing member therebetween. A fan assembly 250 driven by a totally enclosed, fan cooled motor 252 is disposed on an upper portion of the filter housing 230. The fan assembly 250 draws air and unused powder coating from the coating booth 110 through the coating booth exhaust duct 210 and into the filter housing 230 where the powder coating is filtered and separated from the air. The fan assembly 250 similarly draws air and powder coating collected from the conveyor 400 through the conveyor exhaust duct 220 and into the filter housing 230 for filtration. The powder coating drawn into the filter housing 230 accumulates on the exterior surface of the filter cartridges 240 as the air is drawn through the filter cartridges 240 and upward into a plenum 232. The filtered air is then directed through a second filter 260 before the air is returned to the environment or atmosphere. The filter cartridges 240 have a filtration efficiency of approximately 99.9 percent, and the second filter 260 has a filtration efficiency of approximately 95 percent. In an alternative embodiment, the second filter is a Hepa-filter with a filtration efficiency of approximately 99.9 percent.

The coating collector 200 includes an array of valve controlled compressed air dispensing nozzles 270 coupled to a common compressed air manifold 272. Each nozzle 270 is positioned over and directed downwardly into a corresponding filter cartridge 240 for applying one or more pulses of reverse air flow through the filter cartridges 240 so as to dislodge powder accumulated thereon. In one embodiment, the pulse period is on the order of 0.1 seconds, and the air pressure is in a range between approximately 50 and 90 psi. The powder coating dislodged from the filter cartridges 240 is collected in a tapered receptacle 234 at a bottom portion of the filter housing 230 where the powder can be reclaimed for reuse. In one embodiment, a pneumatically operated powder coating transfer pump, not shown, is located at the base of the collection receptacle 234 for pumping the powder back into the coating feed hopper 300 for reuse.

In one mode of operation, the nozzles 270 continuously apply a series of one or more pulses of reversed air flow through each filter cartridge 240 in sequence. According to this procedure, only one of the several filter cartridges 240 is back flushed at any time while the remaining filter cartridges 240 continue operation. In another mode of operation, the nozzles 270 apply a series of one or more pulses in response to a predetermined pressure change measured across the corresponding filter cartridge 240 by corresponding pressure sensors. The pressure change across the second filter 260 is also monitored to prevent discharge of powder into the environment or atmosphere. Excessive powder accumulation on the second filter 260 results in a pressure change across the second filter 260, which is measured by pressure sensors. In one embodiment, a warning indicator is signalled at a first differential pressure measured across the second filter cartridge 260, and the system is shut down at a second, higher pressure differential measured across the second filter cartridge 260. Operation of the coating collector 200 is controllable from the system control panel 60 mounted on the movable base 122, and the venting of filtered air by the coating collector complies with National Fire Protection Association venting standards.

According to the exemplary embodiments of the invention shown in FIGS. 1 and 2, the coating applicator 100, the coating collector 200 and the coating feed hopper 300 are each laterally movable toward and away from the conveyor 400 along tracks or rails 30 for accurately positioning the powder coating systems 10 and 20 relative to the conveyor 400. More specifically, the coating applicator 100 is movable laterally toward the conveyor 400 so as to position the coating booth 110 on-line above the conveyor 400 and downwardly toward the conveyor 400 as discussed above. The coating applicator 100 is also movable laterally away from the conveyor 400 so as to position the coating booth 110 off-line, wherein another coating booth 110 may be positionable on-line. The coating collector 200 is movable toward the conveyor 400 so as to position the coating booth exhaust duct 210 toward the on-line coating booth 110, for coupling with the on-line coating booth 110 as discussed above, and to position the conveyor exhaust duct 220 on-line adjacent the conveyor 400, for collecting unused powder as discussed above. The coating collector 200 is also movable laterally away from the conveyor 400 so as to position the coating booth exhaust duct 210 and the conveyor exhaust duct 220 off-line away from the conveyor 400, wherein another coating collector 200 may be positionable on-line.

FIG. 2 shows the movable base 122 of the coating applicator 100 supported by castors, or wheels 32, movably guided along the rails 30. The coating collector 200 is similarly supported by wheels 33 movably guided along the rails 30. In the exemplary embodiment of FIG. 1, the coating applicator 100 is releasably engagable with the coating collector 200 by fastening members 40 for moving the coating applicator 100 and coating collector 200 in combination. The coating feed hopper 300 is also movable on wheels, which may or may not be guided along the rails 30, and may also be releasably engageable with either the coating applicator 100 and the coating collector 200 for movement in combination therewith. The embodiment of FIG. 1 also includes a drive motor 50 mounted on the base 122 of the coating applicator 100 for automated movement of the coating applicator 100, alone or in combination with the coating collector 200, along the rails 30. In one configuration, the motor 50 drives one or more wheels 34 along the factory floor or along one of the guide rails 30. Operation of the motor 50 and other features of the coating system 10 and 20 is controllable from the system control panel 60 mounted on the base 122.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. An electrostatic powder coating system for coating articles with electrostatic powder coating materials, comprising:

a conveyor for transporting articles to a coating station:

a laterally movable base member;

an upright support member mounted upon said movable base member;

a coating booth, having an open bottom portion, movably mounted upon said upright support member for vertically upward and downward movements alone said upright support member;

an electrostatic coating applicator projecting into said coating booth so as to apply electrostatic powder coating materials to articles disposed within said coating booth; and means for laterally moving said laterally movable base member with respect to said conveyor and means for vertically moving said coating booth with respect to said upright support member so as to laterally position said coating booth toward and away from said conveyor as well as to vertically position said coating booth along said upright support member so as to position said coating booth with respect to an article disposed upon said conveyor at said coating station.

2. The system of claim 1, wherein:

said coating booth comprises carriage means having roller means mounted thereon:

said upright support member comprises roller guide means for guiding said roller means of said coating booth carriage so as to permit said coating booth to undergo said vertically upward and downward movements alone said upright support member; and said means for vertically moving said coating booth along said upright support member comprises a ram having one end thereof fixedly mounted upon said upright support member and an opposite end thereof fixedly mounted to said carriage means coupled to said coating booth.

3. The system of claim 1, wherein:

an extensible canvas, having a first end fixedly mounted upon a first side of said coating booth and fastening means mounted upon a second end thereof for engaging support means mounted upon a second side of said coating booth, is provided for extension across said open bottom portion of said coating booth so as to substantially close said open bottom portion of said coating booth when said coating booth is positioned away from said conveyor.

4. The system of claim 1 wherein said coating booth comprises:

a plurality of non-conductive panels supported upon a framework, wherein at least one of said non-conductive panels includes an opening for receiving said electrostatic coating applicator; and sealing members disposed along opposite side portions of said coating booth for engagement with said conveyor so as to form a seal with said conveyor when said coating booth is moved downwardly toward said conveyor.

5. The system of claim 1 further comprising:

an article transport belt movably mounted upon said conveyor:

an air knife directed toward said article transport belt of said conveyor for separating unused coating from said article transport belt; a coating collector comprising a coating collection housing; a coating booth exhaust duct connectable at one end thereof to said coating booth for withdrawing unused coating from within said coating booth and connectable at an opposite end thereof to said coating collection housing for depositing said unused coating material from said coating booth into said coating collection housing; and a conveyor exhaust duct, for collecting unused coating material separated from said article transport belt by said air knife, having one end thereof operatively connected to said coating collection housing and an opposite end thereof positionable adjacent said article transport belt so that said unused coating material separated from said article transport belt by said air knife can be directed into said coating collection housing.

6. The system as set forth in claim 3, wherein:

said extensible canvas comprises a canvas member coiled upon a rotatable support member;

said support means of said coating booth comprises a support bar; and said fastening means comprises a plurality of hook members for engaging said support bar mounted upon said second side of said coating booth.

7. The system as set forth in claim 1, further comprising:

a second laterally movable base member;

a second upright support member mounted upon said second movable base member;

a second coating booth movably mounted upon said second upright support member for vertically upward and downward movements along said second upright support member for vertically upward and downward movements along said second upright support member;

a second electrostatic coating applicator projecting into said second coating booth so as to apply electrostatic powder coating materials to articles disposed within said second coating booth; and second means for laterally moving said second laterally movable base member with respect to said conveyor and second means for vertically moving said second coating booth with respect to said second upright support member so as to laterally position said second coating booth toward and away from said conveyor as well as to vertically position said second coating booth along said second upright support member so as to position said second coating booth with respect to an article disposed upon said conveyor at said coating station.

said base member and said second base member, and said coating booth and said second coating booth, being alternatively disposable with respect to said coating station so as to selectively coat articles disposed at said coating station with predetermined powder coating materials.

8. The system as set forth in claim 5, wherein:

said coating collection housing comprises filter means for collecting said unused powder coating materials within said coating collection housing.

9. The system as set forth in claim 8, wherein:

said filter means comprises at least one vertical array of a plurality of serially arranged filter cartridges.

10. The system as set forth in claim 9, wherein:

said filter means comprises a plurality of vertical arrays of filter cartridges with each vertical array of filter cartridges comprising a plurality of serially arranged filter cartridges.

11. An electrostatic powder coating system usable for coating articles, the system comprising:

a conveyor, comprising a movable article transport belt, for transporting articles to a coating station:

a laterally movable base member;

an upright support member mounted upon said movable base member:

a coating booth having an open side portion, movably mounted upon said upright support member for vertically upward and downward movements alone said upright support member;

an electrostatic coating applicator disposed within said coating booth so as to apply electrostatic powder coating materials to articles disposed within said coating booth;

a coating collector comprising a coating collection housing;

a coating booth exhaust duct connectable at one end thereof to said coating booth for withdrawing unused coating material from within said coating booth and connectable at an opposite end thereof to said coating collection housing for depositing said unused coating material withdrawn from said coating booth into said coating collection housing;

a conveyor exhaust duct, for collecting unused coating material from said article transport belt, having one end thereof operatively connected to said coating collection housing and an opposite end thereof positionable adjacent said article transport belt so that unused coating material removed from said article transport belt can be deposited within said coating collection housing; and means for laterally moving said laterally movable base member with respect to said conveyor, and means for vertically moving said coating booth with respect to said upright support member so as to laterally position said coating booth toward and away from said conveyor as well as to vertically position said coating booth along said upright support member so as to position said coating booth with respect to an article disposed upon said conveyor at said coating station.

12. The system of claim 11 wherein:

said coating booth further comprises a plurality of substantially electrically non-conductive panels, and a plurality of sealing members disposed along opposite side portions of said coating booth for engagement with said conveyor so as to form a seal with said conveyor when said coating booth is moved downwardly toward said conveyor, and said article transport belt comprises a substantially electrically non-conductive belt having a series of electrically conductive strips electrically coupled to a first electrical potential, said article transport belt being supported by a substantially electrically non-conductive support member.

13. The system of claim 11 wherein:

said conveyor comprises a cleaning member disposed proximate said movable article transport belt for removing unused coating material from said article transport belt.

14. The system of claim 13 wherein:

said cleaning member of said conveyor comprises an air knife directed toward said movable article transport belt for separating said unused coating material from said article transport belt and for directing said separated unused coating material toward said conveyor exhaust duct when said conveyor exhaust duct is positioned adjacent said article transport belt such that said conveyor exhaust duct can collect said unused coating material removed from said air knife.

15. The system as set forth in claim 11, wherein:

said coating booth comprises carriage means having roller means mounted thereon;

said upright support member comprises roller guide means for guiding said roller means of said coating booth carriage so as to permit said coating booth to undergo said vertically upward and downward movements along said upright support member; and said means for vertically moving said coating booth along said upright support member comprises a ram having one end thereof fixedly mounted upon said upright support member and an opposite end thereof fixedly mounted to said carriage means coupled to said coating booth.

16. The system as set forth in claim 11, wherein:

said coating collection housing comprises filter means for collecting said unused powder coating material within said coating collection housing.

17. The system as set forth in claim 16, wherein:

said filter means comprises at least one vertical array of a plurality of serially arranged filter cartridges.

18. The system as set forth in claim 17, wherein:

said filter means comprises a plurality of vertical arrays of filter cartridges with each vertical array of filter cartridges comprising a plurality of serially arranged filter cartridges.

19. A method for operating an electrostatic powder coating system usable for coating articles moving along an article transport belt of a conveyor, comprising the steps of:

providing an article conveyor having an article transport belt;

operating said article conveyor so as to position an article at an article coating station;

providing a laterally movable base member;

mounting an upright support member upon said laterally movable base member;

mounting a coating booth, having an electrostatic powder coating applicator disposed therein, upon said upright support member such that said coating booth is capable of undergoing vertically upward and downward movements alone said upright support member;

laterally moving said base member so as to position said coating booth toward said conveyor;

moving said coating booth downwardly along said upright support member so as to position said coating booth with respect to an article disposed upon said conveyor at said article coating station;

operating said electrostatic powder coating applicator so as to apply a powder coating to an article disposed at said article coating station;

collecting unused coating from within said coating booth with a coating collector having a coating booth exhaust duct connectable to said coating booth;

separating unused coating from said article transport belt with an air knife directed toward said article transport belt; and collecting said unused coating separated from said article transport belt by said air knife with a conveyor exhaust duct coupled to said coating collector and positionable adjacent to said article transport belt so that said unused coating separated from said article transport belt by said air knife can be collected within said coating collector.

20. The method of claim 19, further comprising the step of:

providing a seal between opposite side portions of said coating booth and said conveyor with sealing members engageable with said conveyor when said coating booth is moved toward said conveyor.

* * * * *